US007332019B2

(12) United States Patent
Bias et al.

(10) Patent No.: US 7,332,019 B2
(45) Date of Patent: Feb. 19, 2008

(54) AIR FILTRATION SYSTEM

(75) Inventors: Larry Stephen Bias, Flint, TX (US); Jay Ernest Field, Troup, TX (US); Scott Anthony Salvage, Tyler, TX (US); Shannon Leigh Smith, Flint, TX (US); Stephen J. Vendt, Tyler, TX (US); Mark D. Woodruff, Wills Point, TX (US)

(73) Assignee: American Standard International Inc., New York, NY (US)

( * ) Notice: Subject to any disclaimer, the term of this patent is extended or adjusted under 35 U.S.C. 154(b) by 346 days.

(21) Appl. No.: 11/205,656

(22) Filed: Aug. 17, 2005

(65) Prior Publication Data

US 2007/0039472 A1 Feb. 22, 2007

(51) Int. Cl.
*B03C 3/66* (2006.01)

(52) U.S. Cl. ........................ 96/15; 96/26; 96/30; 96/39

(58) Field of Classification Search ............... 96/15, 96/18, 19, 29–31, 39–41, 51, 22–26; 95/2, 95/4, 6, 7, 25, 57
See application file for complete search history.

(56) References Cited

U.S. PATENT DOCUMENTS

| | | | | |
|---|---|---|---|---|
| 3,504,482 A | * | 4/1970 | Goettl ............................. | 96/18 |
| 3,733,783 A | * | 5/1973 | Burney ............................ | 96/26 |
| 3,785,124 A | * | 1/1974 | Gaylord ........................... | 96/19 |
| 3,898,060 A | * | 8/1975 | Starbuck ......................... | 96/31 |
| 4,057,405 A | * | 11/1977 | Cheney et al. .................. | 96/31 |
| 4,811,197 A | * | 3/1989 | Wexler ........................... | 700/47 |
| 4,921,509 A | * | 5/1990 | Maclin ........................... | 96/18 |
| 5,035,728 A | * | 7/1991 | Fang ............................... | 96/19 |
| 5,068,811 A | * | 11/1991 | Johnston et al. .............. | 700/297 |
| 5,232,478 A | * | 8/1993 | Farris ............................. | 96/26 |
| 5,288,303 A | * | 2/1994 | Woracek et al. ................. | 95/2 |
| 5,290,343 A | * | 3/1994 | Morita et al. ................... | 96/39 |
| 5,454,859 A | * | 10/1995 | Chiba et al. .................... | 96/18 |
| 5,628,818 A | * | 5/1997 | Smith et al. .................... | 96/30 |
| 5,704,955 A | * | 1/1998 | Giles ............................. | 96/26 |
| 5,759,487 A | * | 6/1998 | Jung ............................. | 422/22 |
| 5,820,660 A | * | 10/1998 | Ko ................................ | 96/30 |
| 6,033,457 A | * | 3/2000 | Lawless ........................... | 95/4 |
| 6,040,777 A | * | 3/2000 | Ammann et al. .............. | 340/632 |

(Continued)

FOREIGN PATENT DOCUMENTS

JP          5-154410 A  *  6/1993  ................... 96/30

*Primary Examiner*—Richard L. Chiesa
(74) *Attorney, Agent, or Firm*—William J. Beres; William O'Driscoll

(57) ABSTRACT

An air filtration system includable in and for HVAC equipment includes one or more intense field dielectric filter units and a field charging unit retained in a support structure or cabinet by a removable door which includes control circuitry and contactors engageable with corresponding contact members on a filter unit and the field charging unit for supplying high voltage DC potential to the respective units. Each filter unit includes a filter core comprising a stacked array of filter elements formed of dielectric sheets interconnected by elongated spaced apart ribs forming flow passages. The field charging unit and the filter units are removable from the support or cabinet for cleaning or replacement by opening or removing the door. An interlock switch and a field shorting mechanism are actuated during servicing or replacement of the system components.

36 Claims, 14 Drawing Sheets

U.S. PATENT DOCUMENTS

| | | | |
|---|---|---|---|
| 6,126,727 A * | 10/2000 | Lo | 96/39 |
| 6,129,781 A * | 10/2000 | Okamoto et al. | 96/25 |
| 6,245,131 B1 * | 6/2001 | Rippelmeyer et al. | 96/18 |
| 6,287,368 B1 * | 9/2001 | Ilmasti | 96/19 |
| 6,428,611 B1 * | 8/2002 | Andolino et al. | 96/25 |
| 6,616,736 B2 * | 9/2003 | Massey et al. | 96/25 |
| 6,623,544 B1 * | 9/2003 | Kaura | 95/3 |
| 6,749,669 B1 * | 6/2004 | Gay et al. | 96/67 |
| 6,800,106 B2 * | 10/2004 | Cogar et al. | 55/385.6 |
| 6,979,361 B2 * | 12/2005 | Mihayiov et al. | 96/26 |
| 7,258,715 B2 * | 8/2007 | Cox et al. | 55/422 |
| 7,267,711 B2 * | 9/2007 | Liu | 96/21 |
| 2001/0029728 A1 * | 10/2001 | Massey et al. | 55/471 |
| 2006/0016335 A1 * | 1/2006 | Cox et al. | 96/15 |

\* cited by examiner

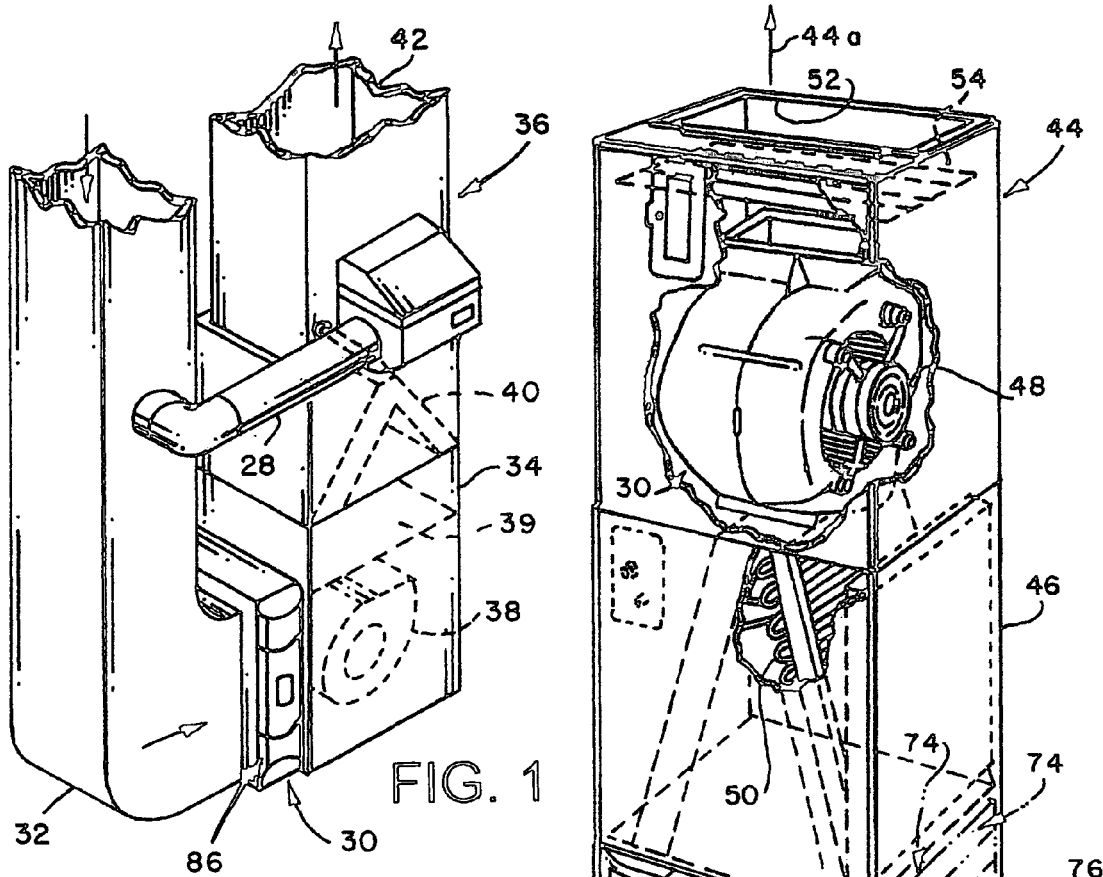
FIG. 1
FIG. 2
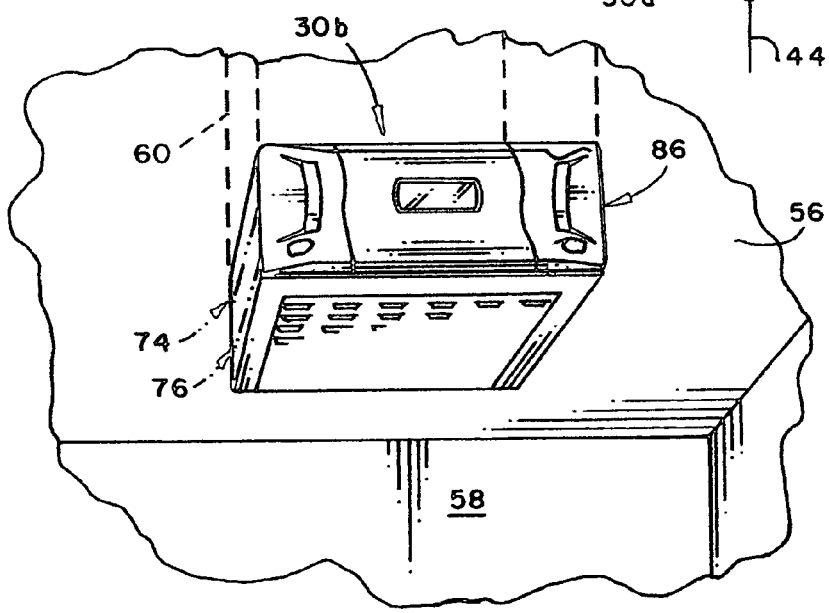
FIG. 3

AIR FILTRATION SYSTEM

BACKGROUND OF THE INVENTION

The filtration of air being circulated by and through heating, ventilating and air conditioning (HVAC) equipment has become an increasingly desirable and necessary process. Historically, air filtration systems and devices associated with HVAC equipment have been provided to maintain the equipment in a state of cleanliness and high efficiency. However, in recent years, the filtration of indoor air has become important to maintain and improve human health and to keep interior rooms and furnishings more clean.

Air filter selection criteria includes filter dirt collection "efficiency", air pressure drop across the filter, available space for the filter system, dirt or dust holding capacity of the system and, of course, initial and replacement costs. With regard to the filtration of indoor air in residential dwellings and commercial facilities, there has been an increasing need for filters which will suitably perform particle filtration. Conventional electrostatic precipitator type filters are widely used wherein an electrical corona field charges particles approaching the filter structure and particles are collected on high voltage metal plates or electrodes. As dirt accumulates on the filter plates, the efficiency of the filter drops and thus this type of filter generally requires frequent maintenance. In this regard, a type of filter known as an intense field dielectric (IFD) filter has been developed wherein electrodes are sealed within a dielectric material and induce charges on the surface of the dielectric resulting in high efficiency particle collection and wherein the particles give up their charges to maintain the electric field as the air flows through the filter system. U.S. Pat. No. 6,749,669 to Griffiths et al. issued Jun. 15, 2004 is directed to an intense field dielectric type filter system. The subject matter of U.S. Pat. No. 6,749,669 is incorporated herein by reference. The implementation of intense field dielectric filters has, however, posed certain problems in the development of a practical, cost effective filter system that may be incorporated in HVAC equipment, attached as an add-on to HVAC equipment and utilized as a stand-alone filter interposed in an air flow duct, for example. The needs and desiderata associated with implementing the basic configuration of an IFD filter has resulted in the development of the present invention.

SUMMARY OF THE INVENTION

The present invention provides an improved air filtration system, particularly adapted for use in filtering air in indoor spaces, including residential dwelling units and commercial buildings. In particular, the present invention also provides a unit of HVAC equipment, including a unique intense field dielectric air filtration system. The present invention further provides an intense field dielectric filter system which may be incorporated as an add-on device associated with a unit of HVAC equipment and, still further, the invention provides an intense field dielectric filter system which may be a stand-alone type system or interposed in a duct through which air is being circulated for heating or cooling purposes.

In accordance with one aspect of the present invention, an air filtration system is provided with a frame for supporting a conventional impingement air filter unit, a so-called field charging unit and one or more air filter units of the intense field dielectric type, all of the units being retained on the frame for easy removal for cleaning, repair or replacement purposes. The air filtration system of the invention includes at least one, and preferably two or more filter units which may be interchangeably mounted on the aforementioned frame, and retained thereon by a removable door which includes system controls and monitoring devices and whereby the filter units may be easily removed for cleaning or replacement. The filter units interlock with each other to prevent air flow bypassing the filter units and are provided with electrode contact members which connect with conductors which connect with contact members on opposite sides of the filter units. Resistors are interposed in the electrical circuits of the filter units to minimize hazards associated with handling units which may retain an electrical charge or are still connected to a source of high voltage electricity.

In accordance with another aspect of the present invention, an air filtration system is provided of an electrostatic or intense field dielectric type which includes a visual display displaying filter operating condition, includes an illuminated on/off switch and a reset switch. These devices are mounted on a door which may be latched in a closed position and which, preferably, includes mechanism operable when the door is unlatched or opened to actuate a so-called shorting bar which discharges electrical potential on major components of the filtration system including the filter unit or units to minimize the chance of a person removing the filter units from support structure when an electrical charge is still present thereon.

Still further, the filtration system of the invention provides a door operably associated with an interlock switch which also deenergizes a power source when the door is moved from a closed to an open position. The door is configured for ease of removal so that a conventional impingement type air filter provided as a prefilter, a field charging unit and the filter unit or units may be easily removed and replaced.

The present invention still further provides an intense field dielectric air filtration system with a compact array of field charging electrodes at the air inlet to the system and is provided with a unique configuration of filter media to provide for inducing electrical charges on or across the surfaces of dielectric sheets or elements to create an intense electric field that results in high efficiency particle collection. Filter elements are arranged in a compact stack or core assembly with a unique arrangement of conductors and electrodes to provide the electric field. The field charging unit of the air filtration system also includes certain features which ensure electrical continuity, minimize bypass air flow and provide a charging unit having a long service life.

The present invention yet further provides an air filtration system having a control system therefor which includes the interlock switch which disconnects electrical power from the filtration system when a cabinet or frame door is moved to an open position. The control system also includes displays and switches which indicate the need to clean the filter components and whether or not power is supplied to the filtration system. The control system provides a fully regulated high voltage power supply including circuitry which minimizes the risk of harmful electrical discharge.

Those skilled in the art will further appreciate the above-mentioned advantages and superior features of the invention, together with other important aspects thereof, upon reading the detailed description which follows in conjunction with the drawings.

BRIEF DESCRIPTION OF THE DRAWINGS

FIG. 1 is a perspective view of an air conditioning unit including an embodiment of the filtration system of the present invention configured as an attachment to the air conditioning unit;

FIG. 2 is a perspective view of an air conditioning unit including an embodiment of the air filtration system of the invention as an integral part of the air conditioning unit;

FIG. 3 is a perspective view showing an embodiment of the air filtration system of the invention as a substantially stand-alone unit disposed in a return air duct;

DETAILED DESCRIPTION OF PREFERRED EMBODIMENTS

Figure 4:
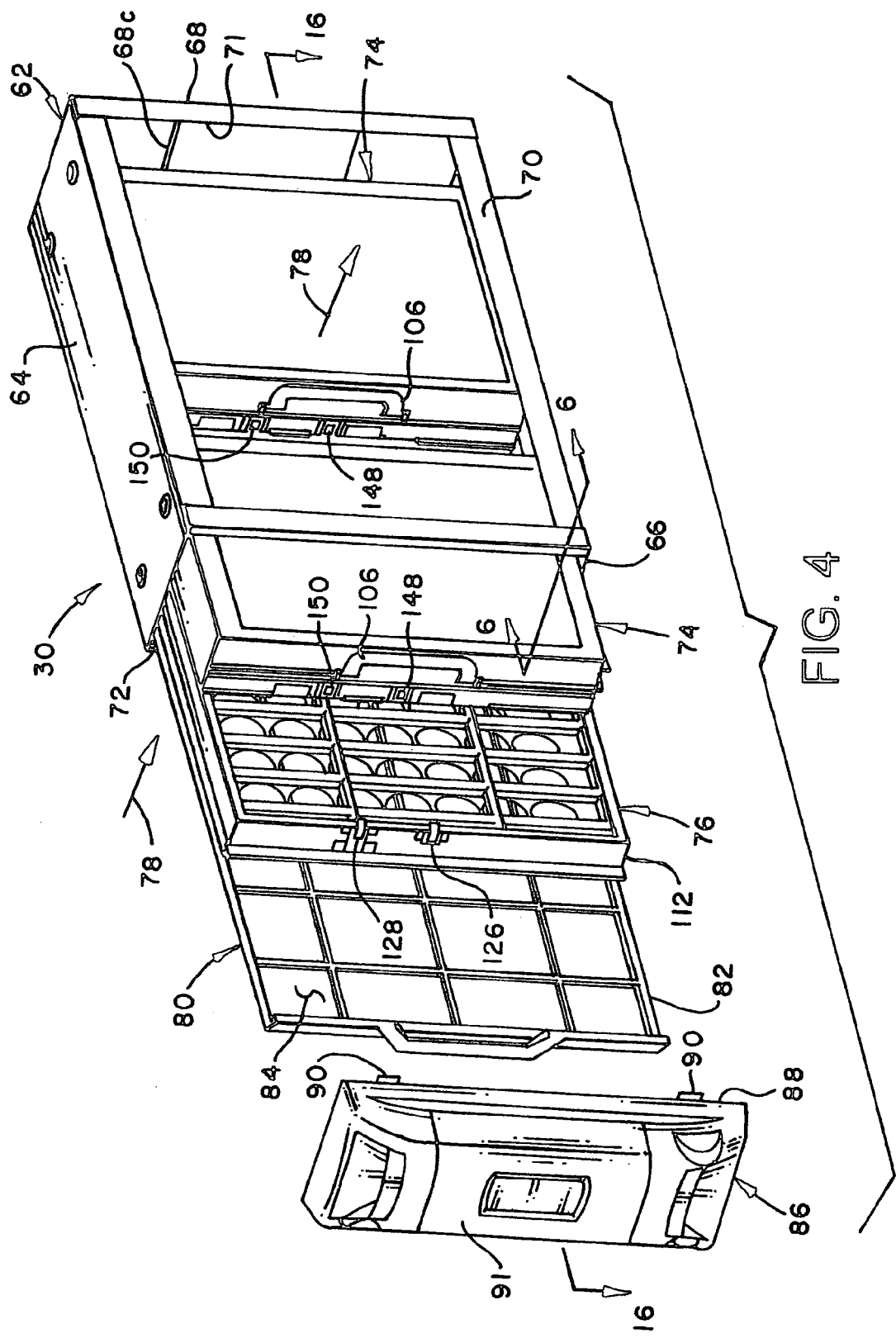
FIG. 4 is a perspective view illustrating major components of the air filtration system of the present invention.

In the description which follows, like parts are marked throughout the specification and drawing with the same reference numerals, respectively. The drawing figures are not necessarily to scale and certain features may be shown in schematic or somewhat generalized form in the interest of clarity and conciseness.

Referring now to FIG. 1, there is illustrated an embodiment of the invention comprising an intense field dielectric air filtration system, generally designated by the numeral 30. The filtration system 30 is shown interposed in an air flowpath from a return air duct 32 leading to the interior of a cabinet 34 for an air conditioning unit 36. The air conditioning unit 36 includes conventional components such as a motor driven fan 38, a furnace heat exchanger 39 and a heat exchanger 40 which may be part of a vapor compression air conditioning system and which may or may not be reversible so that the air conditioning unit 36 may be capable of providing one, or the other or both of heated and cooled air circulated from the duct 32 through the cabinet 34 to a discharge duct 42. Accordingly, the air filtration system 30 is configured as an add-on or attachment unit which may be associated with the air conditioning system or unit 36 for filtering air before such air enters the interior of the system cabinet 34.

FIG. 2 illustrates another arrangement of an air conditioning system or unit 44, including a generally rectangular metal cabinet 46 in which is integrated an embodiment of an air filtration system in accordance with the invention and generally designated by the numeral 30a. It will be understood that the hereinbelow detailed description of the air filtration system of the invention, which will be the embodiment designated by numeral 30, includes all components which are, essentially, also present in the filtration system 30a. However, the filtration system 30a is adapted to be integrated into the air conditioning system or unit 44 which includes a motor driven fan 48 and a conventional, so-called "A" frame heat exchanger 50 adapted to provide heating, cooling or both when air flow is conducted upwardly from the bottom of cabinet 46 through an air inlet opening 51, in the direction of arrows 44a, through the air filtration system 30a, then the heat exchanger 50 and then the blower or fan 48, prior to discharge through an outlet opening 52. The air conditioning unit 44 may also include a furnace section, not shown, and a secondary heating unit 54, disposed downstream of the fan 48 as illustrated in FIG. 2. The filtration system 30a utilizes the cabinet 46 as support structure for filter components to be described herein.

Still further, referring to FIG. 3, there is illustrated another embodiment of the invention comprising a filtration system 30b which is adapted to be, essentially, a stand-alone unit which may be mounted in a duct or, as shown, disposed on a ceiling 56 of an interior room 58 and in communication with a return air duct 60 for an air conditioning system, not shown in FIG. 3. The construction and use of the filtration system embodiments 30, 30a and 30b may be virtually identical. Minor modifications in the construction of an outer frame, housing or cabinet for the filtration units 30, 30a and 30b may be necessary or desirable to adapt the units to the specific application. For example, in an integrated application, such as illustrated in FIG. 2, a support structure, frame or cabinet for the filtration system may be integrated into the air conditioning system cabinet 46. Although the filtration systems 30, 30a and 30b are shown interposed in an air flowpath upstream of or in a unit of HVAC equipment, the filtration systems may be disposed downstream of such equipment, if desired.

Figure 5:
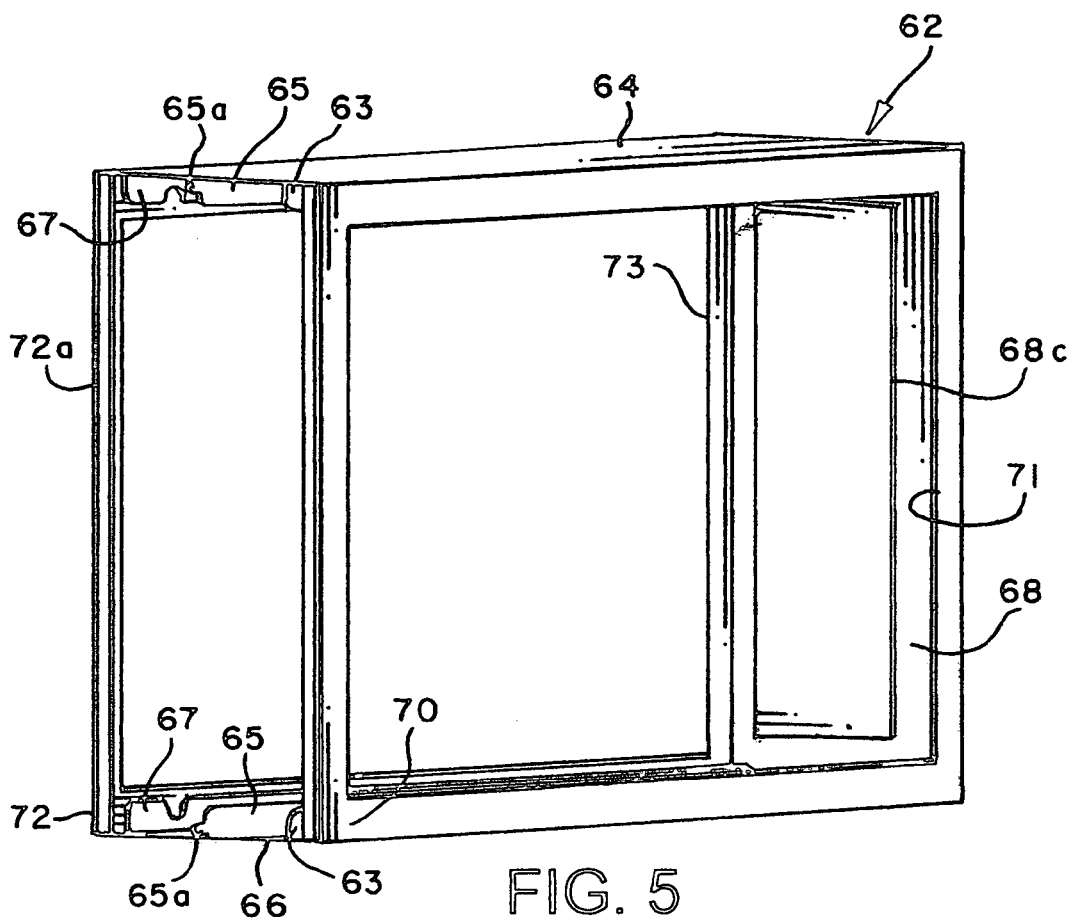
FIG. 5 is a perspective view of a frame or cabinet for the system shown in FIG. 4.
Figure 6:
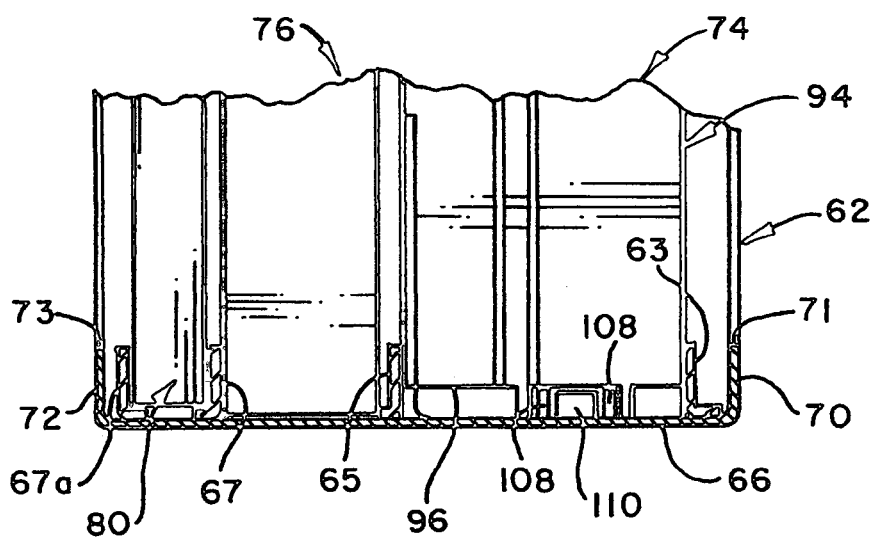
FIG. 6 is a detail section view taken generally along the line 6-6 of FIG. 4.

Referring now to FIG. 4, there is illustrated the air filtration system embodiment designated by the numeral 30 which includes a generally rectangular box shaped outer frame or cabinet 62 which may be constructed of a conventional material, such as steel or aluminum and characterized by a top wall 64, a bottom wall 66, an end wall 68 and opposed sidewalls 70 and 72, see FIGS. 5 and 6, also. Spaced apart, parallel sidewalls 70 and 72 are both provided with large, generally rectangular openings 71 and 73, respectively, as shown in FIG. 5. The end of cabinet 62 opposite the end wall 68 is substantially open.

Referring further to FIG. 4, the air filtration system 30 is characterized by at least one electrically chargeable filter unit 74. Two filter units 74 are preferably incorporated in the filtration system 30, as shown in FIG. 4, for ease of handling for replacement or servicing. Still further, the filtration system 30, as shown in FIG. 4, includes a field charging unit, generally designated by the numeral 76. Filter units 74 and field charging unit 76 may be removably disposed in frame or cabinet 62 and wherein the filter units 74 are disposed downstream in the direction of flow of air through the filtration system from the field charging unit 76. The direction of air flow through the air filtration system 30 is designated by arrows 78 in FIG. 4.

Referring still further to FIG. 4, the air filtration system 30 is further provided with a prefilter unit 80 which is also removably disposed within cabinet 62 and interposed the field charging unit 76 and cabinet wall 72. Prefilter 80 may be of conventional construction comprising, for example, a perimeter frame 82 and a porous media 84 which may be of conventional construction and adapted to filter relatively large particles from an air flowstream flowing through the filtration system before the flowstream encounters the field charging unit 76 or the filter units 74. The filter units 74, the field charging unit 76 and the prefilter unit 80 are retained in the cabinet 62 by a removable door, generally designated by the numeral 86. Door 86 includes a backplate or base 88 including tab or hinge members 90 adapted to be suitably removably connected to cabinet 62 to retain the door 86 in a closed position over the open end of cabinet 62 which is opposite the end wall 68. Door 86 is provided with a hollow shell body member 91 in which are disposed suitable control elements and associated mechanism which will be explained in further detail herein.

Figure 10:
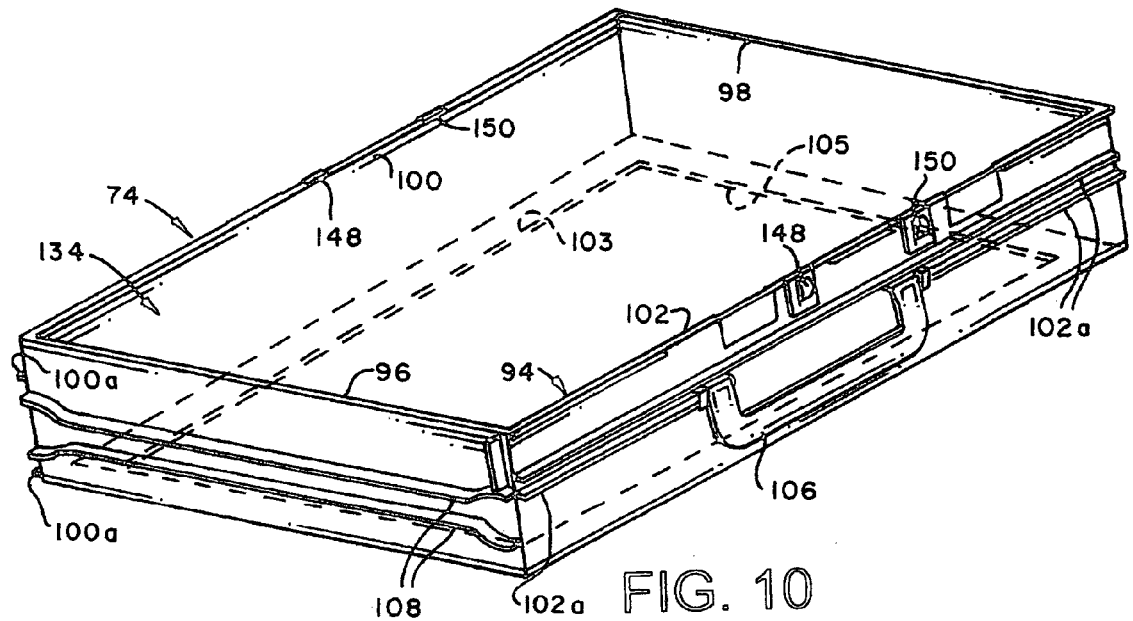
FIG. 10 is a perspective view of one of the interchangeable and removable filter units for the air filtration system of the present invention.

Referring briefly to FIG. 10, one of the filter units 74 is illustrated and is characterized by a rectangular boxlike perimeter frame 94 including a bottom wall 96, a top wall 98 and opposed sidewalls 100 and 102. An end wall 103 is provided on the air discharge side of each filter unit 74 and is delimited by a large rectangular opening 105. Frame 94 is preferably made of a suitable dielectric material, such as an ABS plastic, and includes a manipulating handle 106. Bottom wall 96 of frame 94 also includes spaced apart, depending guide members 108 forming a channel therebetween. Elongated sealing or standoff ribs 100a and 102a project outwardly from and normal to walls 100 and 102, respectively.

Referring briefly to FIGS. 5 and 6, filter units 74, one shown in FIG. 6, are retained properly disposed within cabinet 62 by opposed spaced apart elongated guide members 63 and 65. A third guide member 67 is also disposed on and facing inwardly from cabinet walls 64 and 66. Guide members 67 are spaced from guide members 65 and form channels for properly positioning the field charging unit 76. A channel formed between guide members 67 and 67a, FIG. 6, provides means for locating and retaining the prefilter 80.

In order to avoid incorrect positioning of the filter units 74 within cabinet 62, at least one locating boss 110, FIG. 6, projects upwardly from bottom wall 66 and is operable to be received within the channel formed by the guide members 108 on bottom wall 96 of frame 94. Guide members 108 are not centered between the opposed edges of the top, bottom and sidewalls forming the frame 94. Accordingly, the filter units 74 may be inserted in the cabinet 62 with only a predetermined orientation to provide suitable electrical connections therebetween and between at least one of the filter units 74 and electrical contacts formed on the door base 88, as will be further described herein.

Figure 7:
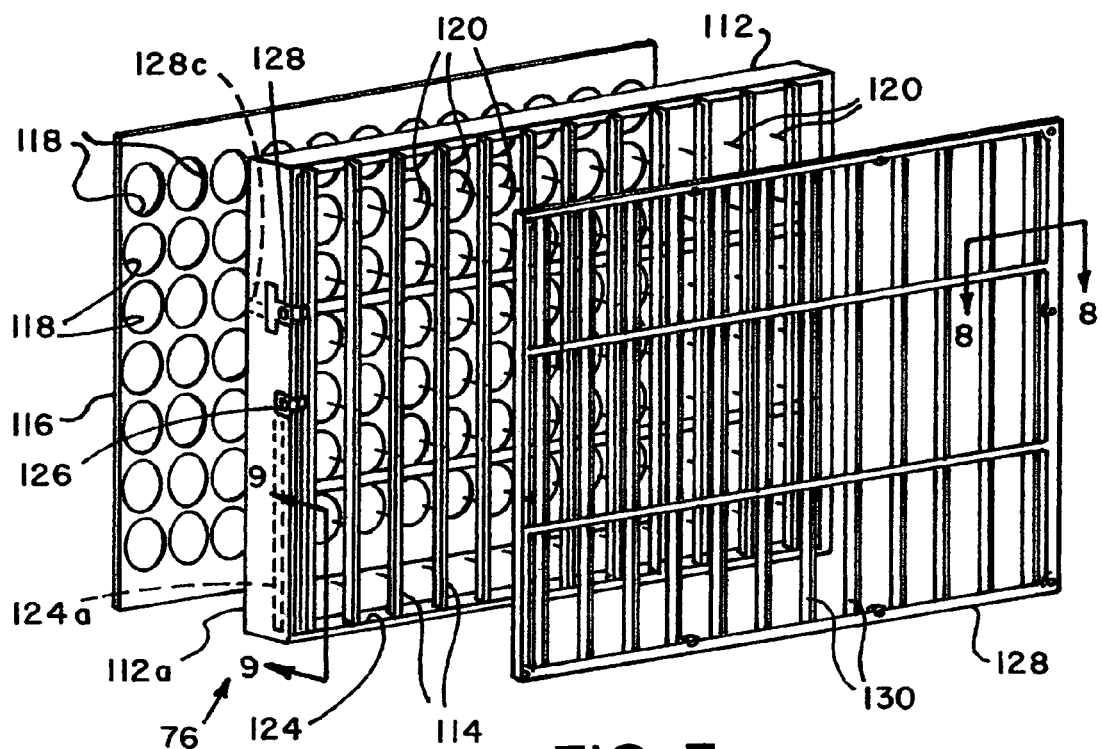
FIG. 7 is an exploded perspective view of the field charging unit for the air filtration system of the invention.
Figure 8:
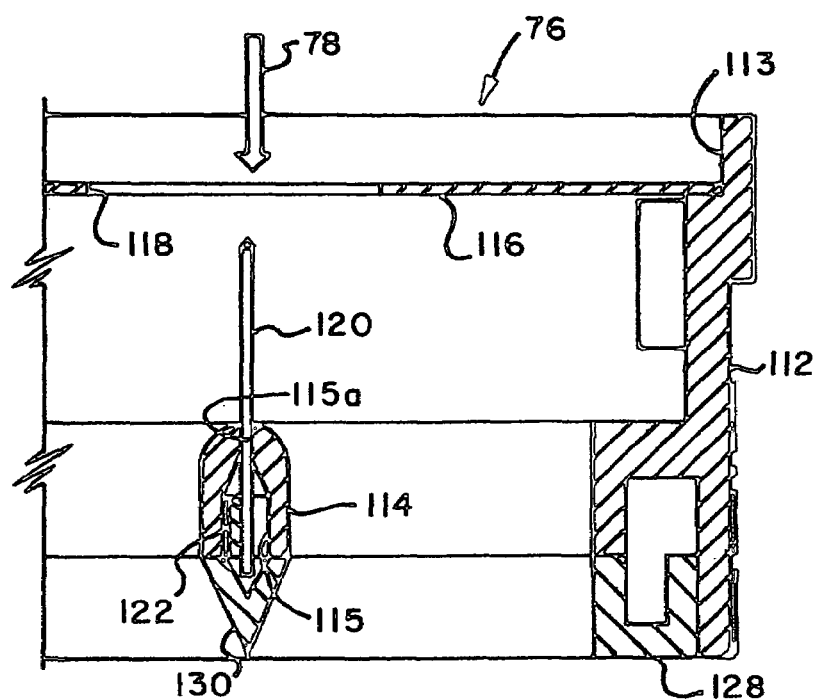
FIG. 8 is a detail section view taken generally along the line 8-8 of FIG. 7.
Figure 9:
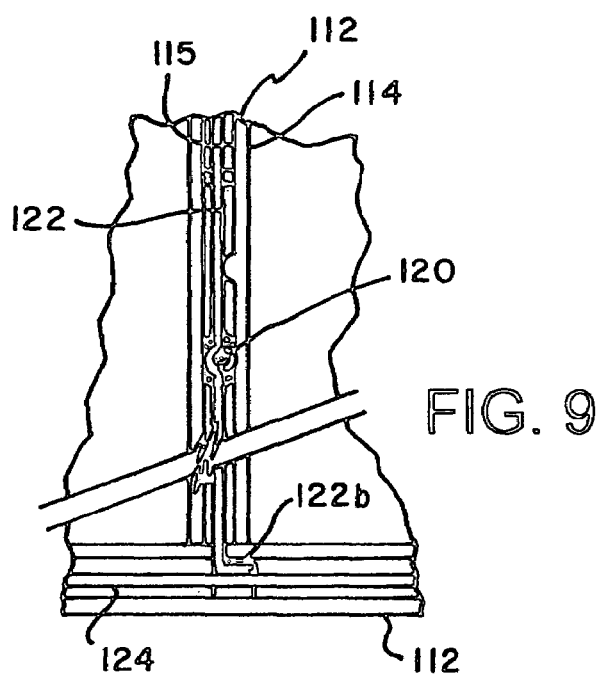
FIG. 9 is a detail view taken generally from the line 9-9 of FIG. 7.

Referring now to FIGS. 7, 8 and 9, the field charging unit 76 is characterized by a generally rectangular perimeter frame 112 supporting spaced apart parallel rib members 114. A generally rectangular, thin, stainless steel charging plate 116 is provided with rows and columns of relatively large openings 118, which are shown as being circular. Field charging plate 116 is supported on frame 112 in a recess 113, see FIG. 8, and the columns of openings 118 are arranged such that each opening is coaxially aligned with a field charging pin 120. Plural ones of electrically conductive metal pins 120 are supported spaced apart on the ribs 114, as illustrated in FIG. 7, extend normal to the plane of plate 116 and parallel to the direction of airflow through the charging unit 76. Ribs 114 are provided with elongated slots 115, FIGS. 8 and 9, which support respective pin electrical conductor bars 122 engageable with each of the pins 120, respectively. Pins 120 are each also supported in respective pin bores 115a formed in respective ribs 114, one shown by way of example in FIG. 8. Each of the pin conductor bars or strips 122 includes a clip 122b, FIG. 9, engaged with an elongated busbar 124, FIGS. 7 and 9, which busbar includes an integral part 124a electrically connected to an electrical contact member 126 mounted on frame 112, see FIG. 7. A second contact member 128 spaced from contact member 126, FIG. 7, is supported on frame 112 and is operable to be electrically connected to charging plate 116 by way of a conductor strip 128c.

Field charging unit 76 is further characterized by a rectangular grid-like cover member 128, FIGS. 7 and 8, which includes parallel spaced apart ribs 130 corresponding in spacing to the ribs 114 of the frame 112. Cover member 128 is suitably releasably connected to frame 112 and is operable to cover the conductors 122 and retain the pins 120 in their respective positions on the ribs 114 as illustrated. The relative positions of the pins 120 with respect to the openings 118 in the charging plate 116 is illustrated in FIG. 8, by way of example. Charging unit frame 112 includes at least one elongated air baffle or seal member 112a, FIGS. 7 and 16, formed thereon. Frame 112 and cover 128 may also be formed of ABS plastic.

Figure 11:
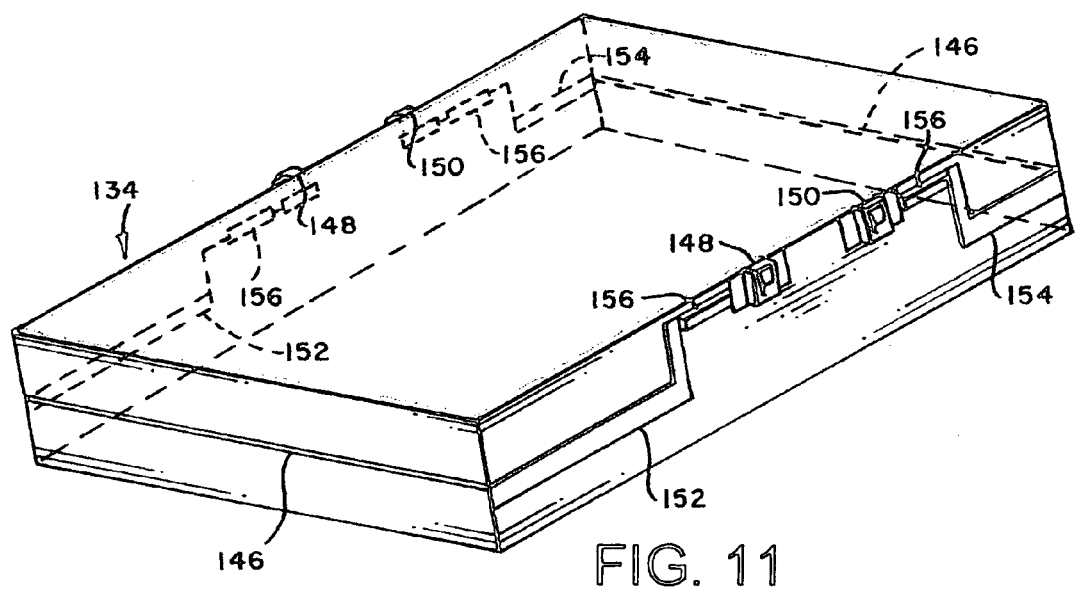
FIG. 11 is a perspective view of a filter unit core assembly for the filter unit shown in FIG. 10.
Figure 12:
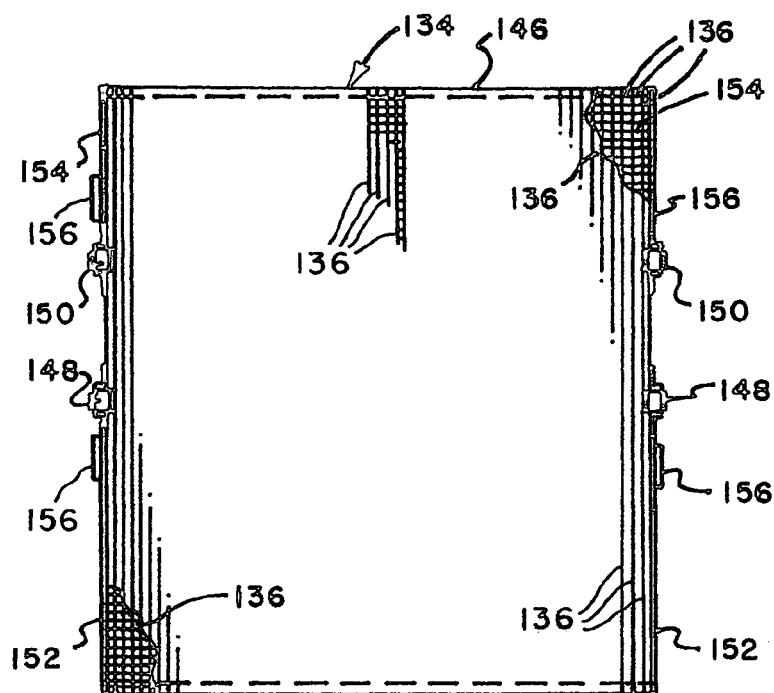
FIG. 12 is a front elevation of the core assembly shown in FIG. 11.
Figure 13:
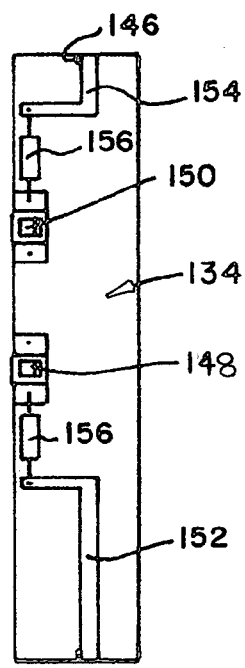
FIG. 13 is a side elevation of the core assembly shown in FIGS. 11 and 12.
Figure 15:
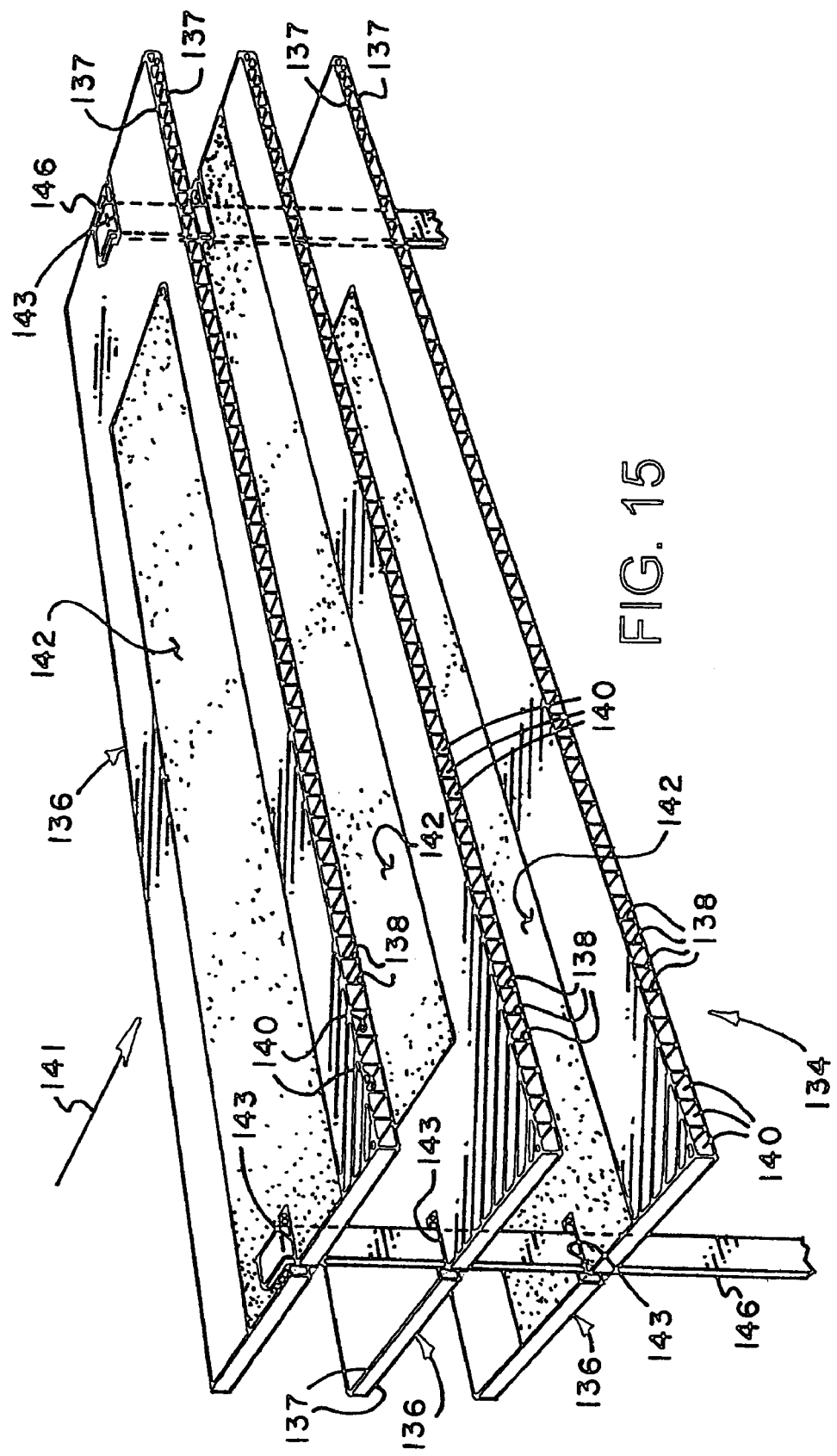
FIG. 15 is a detail exploded perspective view illustrating the arrangement of the filter elements of a filter unit.

Referring now to FIGS. 11 through 13, each of the filter units 74 is characterized by a core assembly 134 of filter elements. Core assemblies 134 are characterized by generally rectangular stacks of side-by-side contiguous filter elements 136, see FIGS. 12 and 15. As shown in FIG. 15, each filter element 136 comprises two spaced apart thin walled sheet-like members 137 which are interconnected by elongated spaced apart parallel ribs 138 leaving parallel air flow spaces or passages 140 therebetween whereby air may pass through each of the filter elements in the direction of the arrow 141 in FIG. 15, or in the opposite direction. Filter elements 136 are each provided with one electrically conductive surface 142 formed on one of the members 137, such as by printing with a conductive ink, for example. Each filter element 136 is provided with opposed slots 143 which open to opposite ends of the filter elements, respectively, as shown in FIG. 15. One of slots 143 also intersects conductive surface 142, as shown. Filter elements 136 are preferably formed of a suitable dielectric material, such as extruded polypropylene, except for the conductive surfaces 142. Filter elements 136 are stacked contiguous with each other using a suitable adhesive between elements to form the core assembly 134 and are arranged alternately, as illustrated by way of example in FIG. 15, so that a high voltage electrical charge potential may be imposed on the conductive surfaces 142 by respective elongated conductor strips 146, FIG. 15. In this way, an electrical field is created across the flow passages 140 between the sheet members 137 to attract and retain particulates in the air flowstream flowing through the flow passages 140, as taught by U.S. Pat. No. 6,749,669. When elements 136 are assembled in a stack, conductive ink is also preferably applied at each slot 143 to provide suitable electrical contact between strips 146 and only the conductive surfaces 142 which are intersected by a slot 143.

Figure 16:
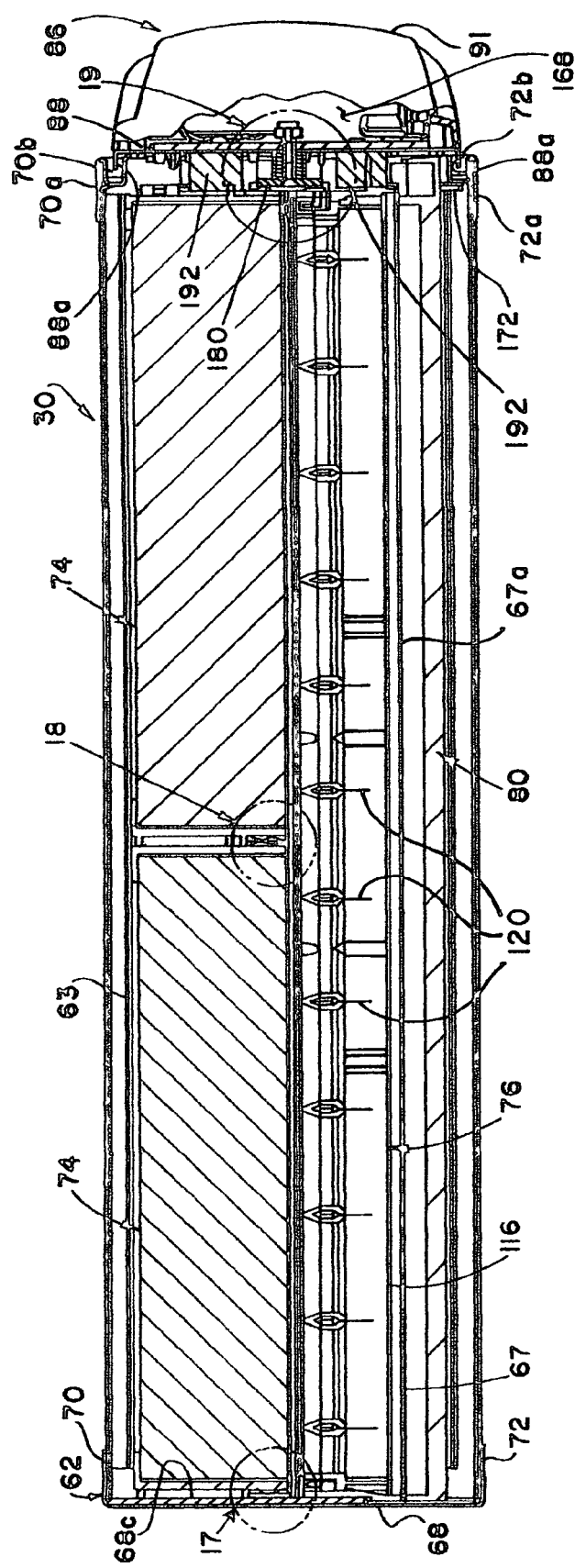
FIG. 16 is a section view taken generally along the line 16-16 of FIG. 4 with the major components of the air filtration system assembled in and connected to the system cabinet.
Figure 17:
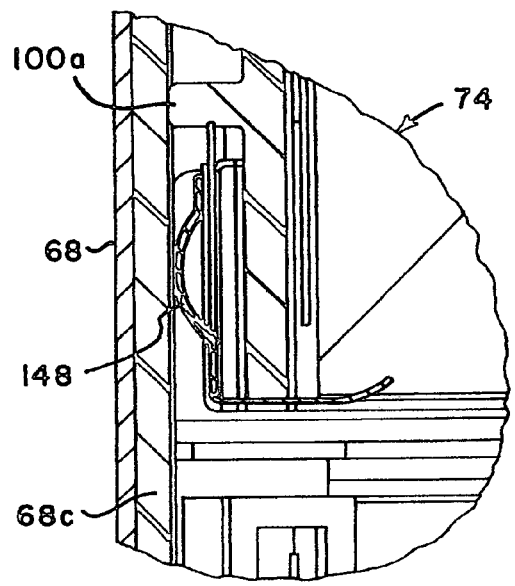
FIG. 17 is a detail view on a larger scale of the encircled area 17 of FIG. 16.
Figure 18:
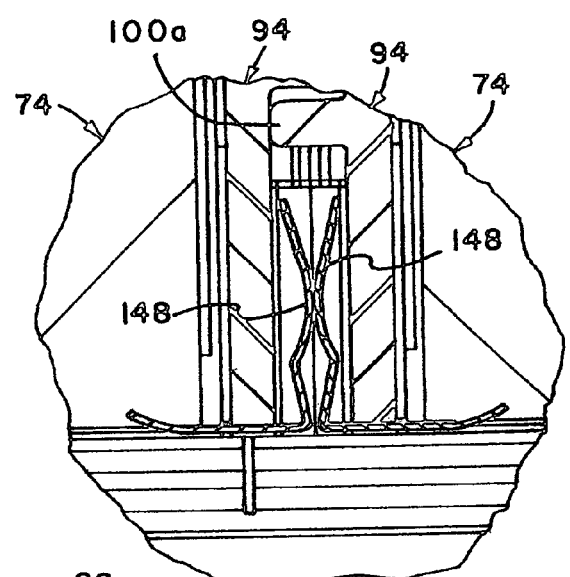
FIG. 18 is a detail view on a larger scale of the encircled area 18 of FIG. 16.

Accordingly, referring again to FIGS. 11, 12 and 13, the filter core assemblies 134, made up of the stacked filter elements 136, are provided with electrically conductive paths provided by electrical contact members 148 and 150 which are in communication with respective electrical conductor strips 152 and 154 by way of resistor elements 156. Each of conductors 152 and 154 is suitably supported on a core assembly 134 and connected to a conductor strip 146, as shown in FIGS. 11, 12 and 13, and conductor strips 146 are also in electrically conductive communication with a mirror image set of conductor strips 152 and 154 on an opposite side of the core assembly 134 from that shown in FIG. 13, as indicated in FIGS. 11 and 12. Resistors 156 are also interposed in the circuitry formed by the conductors 152 and 154 on the opposite side of each core assembly 134 and the conductor strips 152 and 154 on each side of a core assembly are in conductive communication, respectively, with contact members 148 and 150. See the schematic diagram of FIG. 24 also. In this way, a voltage or potential may be applied to both filter units 74 when they are disposed in the cabinet 62 since a set of contact elements 148 and 150 on one side of a frame 94 will engage a corresponding set of contact elements 148 and 150 on the opposite side of the frame 94 of an adjacent filter unit 74 regardless of which filter unit 74 is placed in the cabinet first, see FIG. 18, by way of example, for contact elements 148, and FIG. 24 also. As shown in FIGS. 16 and 17, an electrical insulator member 68c is supported on an inside surface of cabinet wall 68 to prevent a short circuit between unused contact members 148 and 150 via wall 68.

Figure 14:
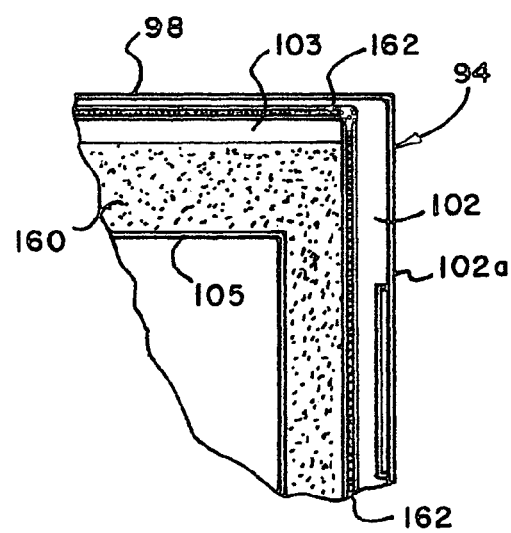
FIG. 14 is a detail view illustrating the manner in which a core assembly is retained in the frame of a filter unit.

Referring briefly to FIG. 14, each core assembly 134 is secured in its associated frame 94 by placing a pad of adhesive 160 on perimeter flange or wall 103, mounting the core assembly 134 to the frame 94 and also sealing the perimeter of the core assembly to the frame by a substantially continuous perimeter bead of adhesive 162, as shown. In this way each core assembly 134 is sealed in its frame 94 to prevent air leakage between the core assembly and the frame and to prevent water leakage between the core assembly and the frame during cleaning operations. The adhesive may be a suitable curable polymer, such as an epoxy type.

Figure 19:
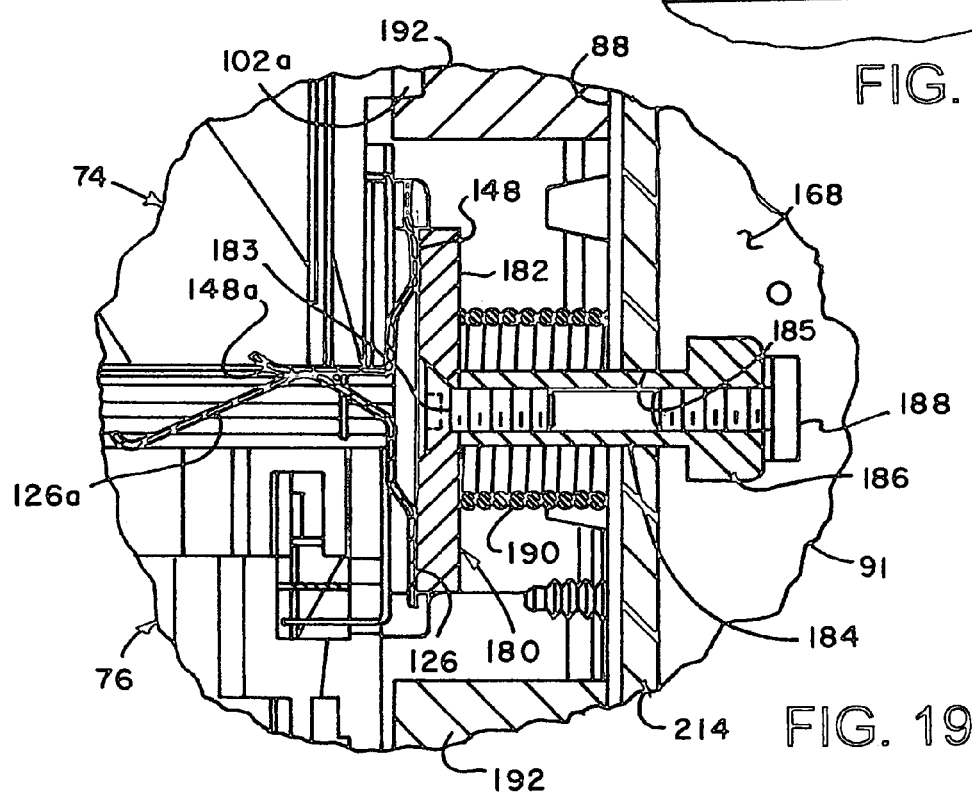
FIG. 19 is a detail view on a larger scale of the encircled area 19 of FIG. 16.
Figure 20:
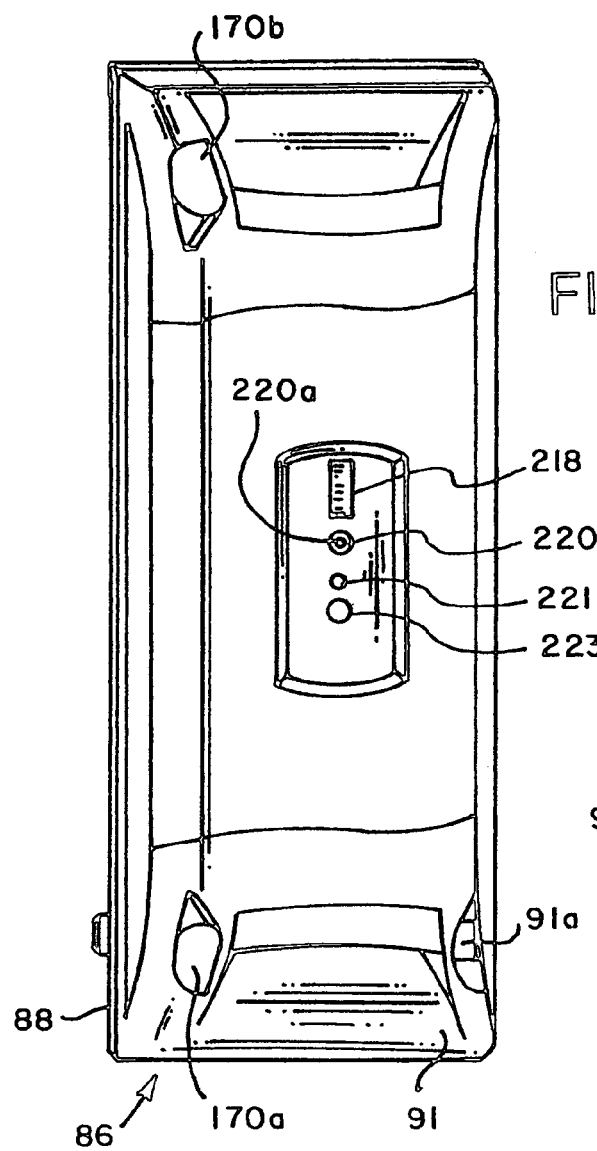
FIG. 20 is a perspective view of the front or outer side of the removable door for the air filtration system illustrated in FIG. 4.
Figure 21:
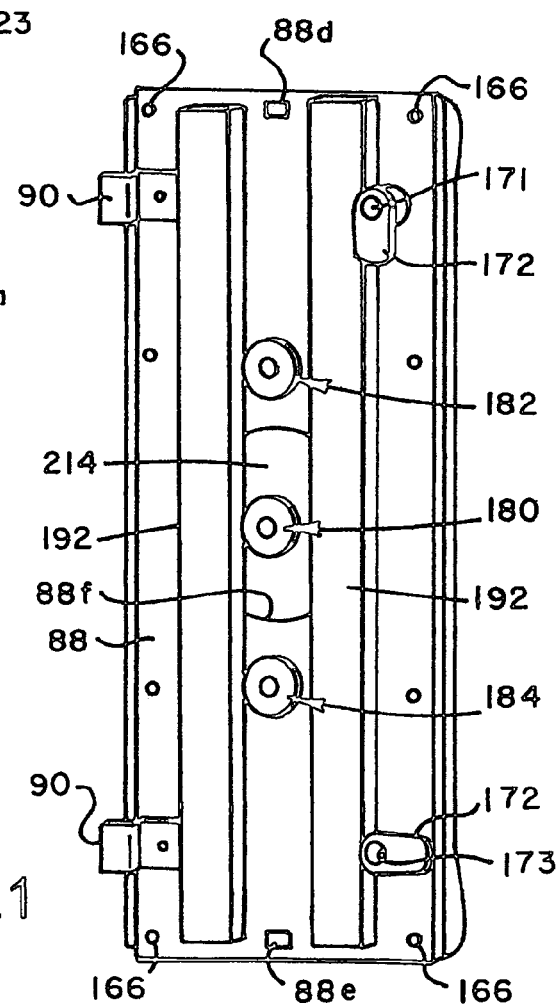
FIG. 21 is a perspective view of the backside of the door shown in FIGS. 4 and 20.

Referring now to FIGS. 20 and 21, the door 86 is further illustrated, including the generally flat, metal plate base or backwall 88 and the door cover 91. Door cover 91 and base 88 are suitably secured together by removable fasteners 166, as shown in FIG. 21, to define an interior space 168, FIGS. 16 and 19, in which suitable control mechanism and circuitry is disposed, as will be described herein. As shown in FIG. 20, door 86 is provided with spaced apart rotatable latch handles 170a and 170b which are supported by base 88 for limited rotation with respect to cover 91 and are operably connected to rotatable latch members 172, FIG. 21, whereby, when door 86 is mounted on cabinet 62 it may be latched in its working position as shown in FIG. 16, for example, but also may be removed from cabinet 62 to provide for insertion and removal of the filter units 74, the field charging unit 76 and the prefilter 80. In this regard, as shown in FIG. 16, cabinet 62 includes opposed, elongated channel members 70a and 72a mounted on the opposed sidewalls 70 and 72 and latch members 172, one shown in FIG. 16, are engageable with channel member 72a to retain the door assembly in a closed and latched position. Retainer or hinge members 90 are similarly engaged with channel member 70a. Channel members 70a and 72a are provided with resilient seal strips 70b and 72b, FIG. 16, engageable with inturned flanges 88a on base member 88, as shown.

Referring again to FIG. 21, door base member to 88 supports spaced apart electrical contactors 180, 182 and 184. Contactors 182 and 184 are electrically connected to each other via conductive base member to 88 form a ground conductor while contactor 180 is connected to a source of high voltage potential as described further herein. Contactors 180, 182 and 184 are mounted on base member 88, generally as illustrated in FIG. 19, by way of example, for contactor 180. Referring to FIG. 19, contactor 180 includes a cylindrical plate part 182 engageable with contact elements 148 and 126, as shown. Contact members 148 and 126 include cooperating engageable legs 148a and 126a, FIG. 19, to assure good conduction to and between units 74 and 76 and contactor 180. Contactor 180 includes a central conductor shaft part 184 connected to plate part 182 by a screw 183. Shaft part 184 includes a head 186 which is adapted to support a conductor terminal screw 188. Contactor 180 is mounted for limited movement on base member 88 and is spring biased to engage the contacts 126 and 148 by a coil spring 190 engageable with an insulator plate 214 and contactor plate 182. Screw 188 is suitably connected to a conductor, not shown, for applying high voltage electrical potential to contactor 180. An opening 88f in plate-like base member 88, FIG. 21, avoids electrically conductive contact between contactor 180 and base member 88 and shaft 184 is supported for limited sliding movement in a bore 185 in insulator plate 214, FIG. 19. As mentioned previously, contactors 182 and 184 are similarly mounted on base 88 and are electrically connected to each other, preferably through base 88. By providing opposed contactors 182 and 184, which are the ground (negative) contactors, above and below or on opposite sides of the positive contactor 180, the door 86 may be installed in either direction with respect to the cabinet 62 while still making proper electrical contact with the contacts 148 and 150 of the filter units 74 and the contracts 126 and 128 of the field charging unit 76.

As shown in FIG. 21, base 88 is also provided with openings 88d and 88e at opposite ends, as shown, for receiving the projections 65a on cabinet 62, see FIG. 5, one of which projections will engage an interlock switch disposed on door 86 regardless of which position the door is mounted on the cabinet 62. As further shown in FIG. 21, and also FIG. 16, elongated insulation members 192 are preferably disposed on base 88 on opposite sides of the contactors 180, 182 and 184 to minimize generation of stray electrical fields.

Figure 22:
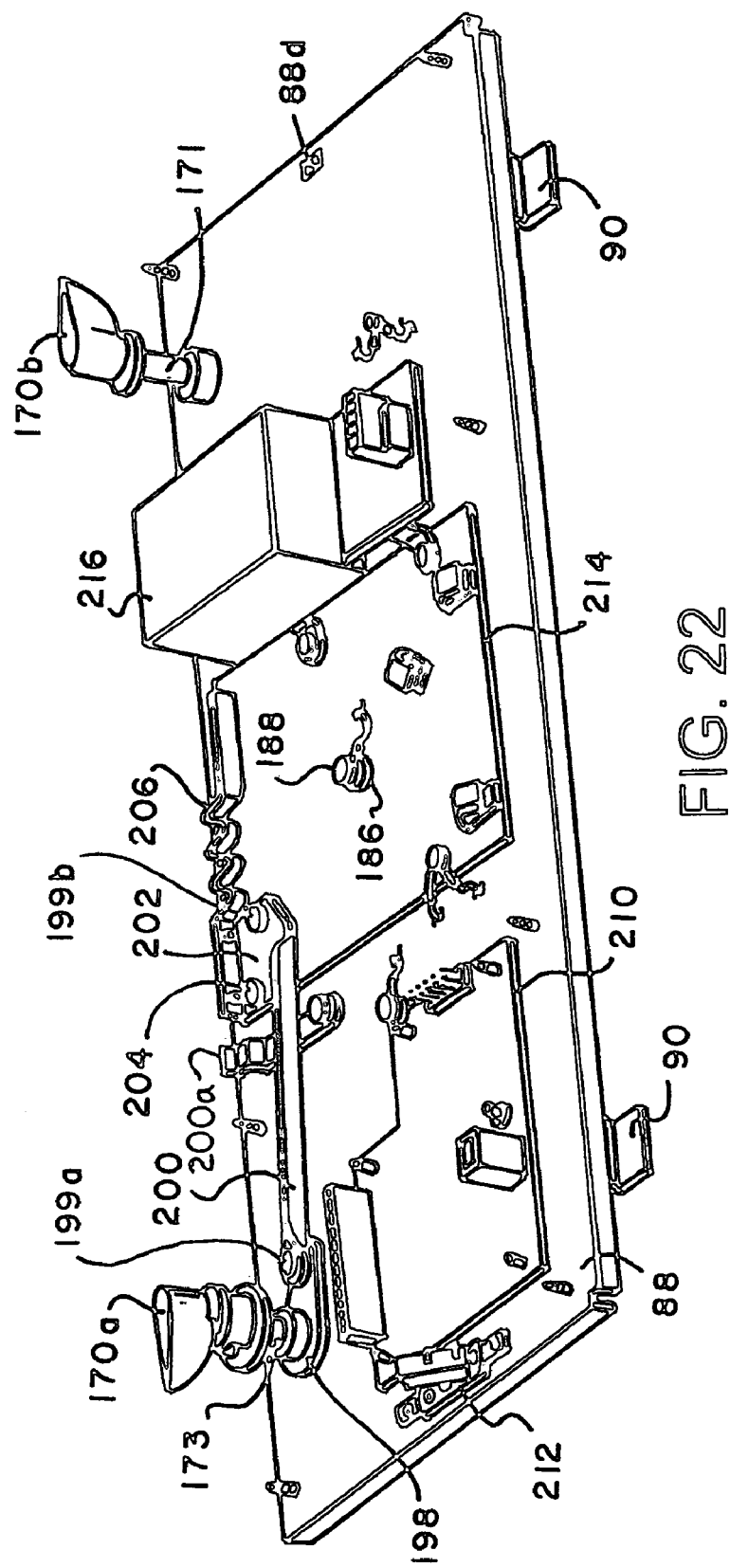
FIG. 22 is a perspective view illustrating certain components of a control system and a mechanism for shorting the contacts for the field charging unit and the filter units when the door is unlatched.

Referring now to FIG. 22, the door base 88 is shown with the door cover 91 removed therefrom to illustrate certain components supported on the base. As shown in FIG. 22, latch handles 170a and 170b are connected, respectively, to latch shaft members 173 and 171, which shaft members are mounted on base 88 for rotation with respect thereto. Shaft members 171 and 173 are connected, respectively, to latches 172, FIG. 21. Shaft member 173 is also connected to a link or arm 198 which is pivotally connected at 199a to a second arm 200. Link or arm 198 rotates with shaft 173. The opposite end of arm 200 is pivotally connected at 199b to a shorting bar support member 202 supported for pivotal movement on base 88 about a pivot 204. Support member 202 supports an elongated metal shorting bar 206 which, upon movement of the latch handle 170a from a door latching position to a position to allow the door 86 to be opened and removed from cabinet 62, moves into engagement with contactor head member 186 to short the contacts 148 and 126 to ground through the base member 88. Accordingly, in this way a user of the filtration system 30, 30a or 30b, may normally avoid incurring electrical shock by residual voltage potential stored in the components of the filtration system when the door is opened to allow access to the filter units 74 or 80, or the field charging unit 76, for example. Another grounding member 200a, FIG. 22, is mounted on base 88 and is operable to ground a decorative plate, not shown, on the outer face of door cover 91.

As further shown in FIG. 22, a controller circuit board 210 is mounted on base 88 adjacent an interlock switch 212. Interlock switch 212 is mounted adjacent opening 88e in base 88 and is engageable with one of the projections or tabs 65a when the door 86 is in a closed position on cabinet 62. When the door 86 is opened, relative movement of a tab 65a causes interlock switch 212 to move to a position to shut off an electrical power supply to the filtration system 30, again to minimize the risk of electrical shock. Insulator plate 214 is mounted on base 88 as illustrated in FIG. 22 and supports contactor 180 through its support shaft 184 and to isolate the contactor 180 from the metal base member 88. Still further, viewing FIG. 22, there is illustrated a high voltage DC power supply unit 216 mounted on base 88.

Referring briefly again to FIG. 20, the cover 91 of door 86 is provided with a visual indicator or display 218, a push button switch including an actuator 220, a second visual indicator 221 and a second push button switch including an actuator 223. Switch actuator 220 may also include a visual indicator 220a. Visual display 218 is characterized as a light emitting diode (LED) type display with a so-called bargraph array plural multi-colored, preferably red, yellow and green LED visual indicators 218a, 218b, 218c, FIG. 23, for displaying such features as remaining filter life, need for servicing the filter units 74, and other control or test functions, for example. Push button switch or key 220 is operable to function as a main on/off or master switch for energizing the filtration system 30. Visual indicator 221 is operable to indicate when prefilter 80 should be replaced and pushbutton switch 223 is operable to reset timers for the prefilter 80 and for indicating filter life or servicing intervals for filter units 74. Displays 218 and 221 and switches 220 and 223 are preferably mounted on a circuit board, not shown, disposed on door cover 91.

Figure 23:
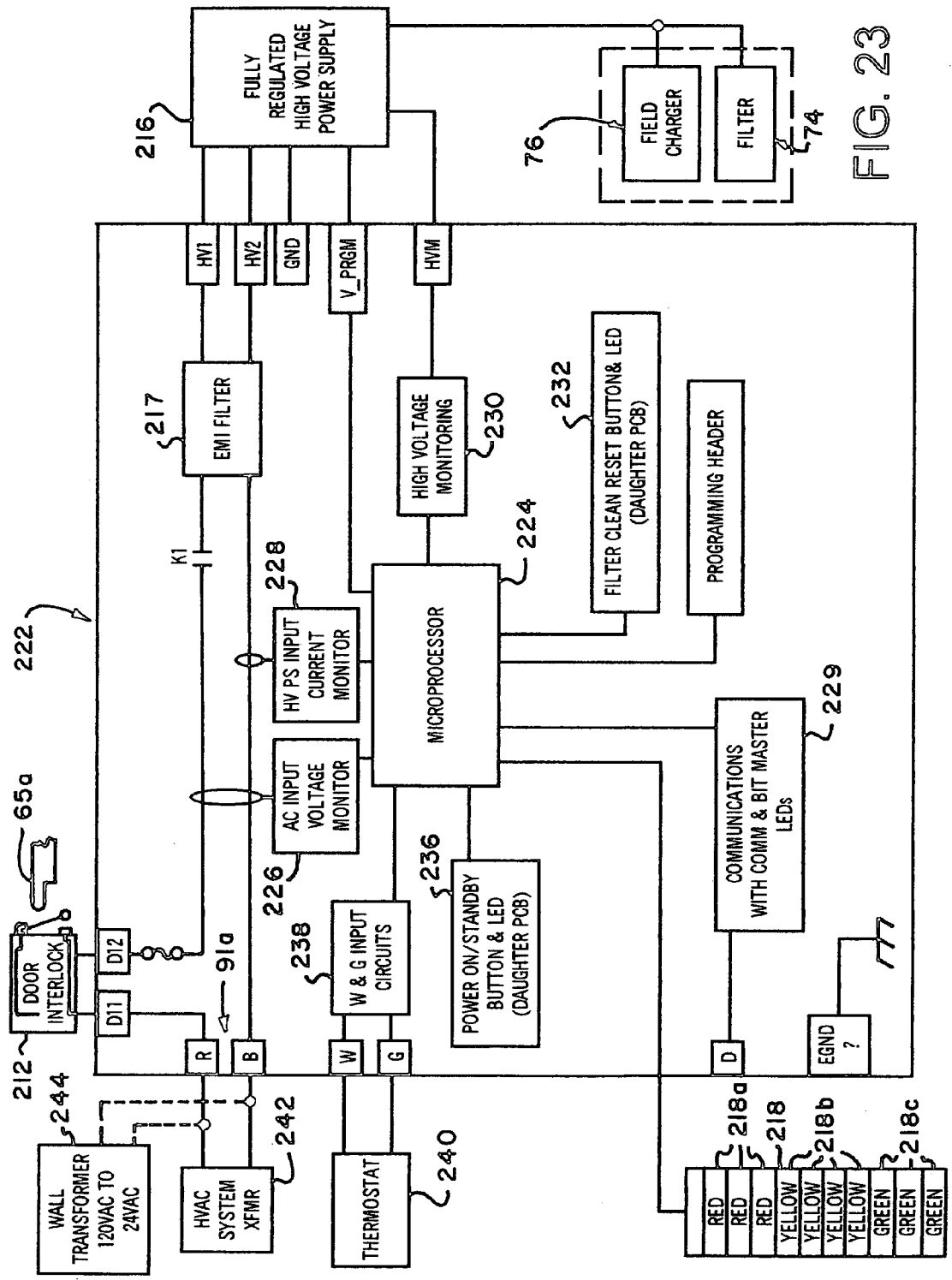
FIG. 23 is a block diagram of control circuitry for the air filtration system of the invention.

Referring now to FIG. 23, there is illustrated a block diagram for a control system for the filtration system 30, which control system is generally designated by the numeral 222. Control system 222 includes a microprocessor 224 operably connected to a low voltage AC input voltage monitor circuit 226 and a high voltage power supply input current monitor circuit 228. Microprocessor 224 is also connected to a high voltage monitoring circuit 230, and the filter cleaning reset button switch 223 and LED indicator 221, including a circuit for same, as indicated by numeral 232 in FIG. 23.

As further shown in FIG. 23, the multiple LED display or bargraph 218 is adapted to receive output signals from microprocessor 224. A power on/off switch control circuit 236, which includes switch 220 and visual indicator 220a, is connected to microprocessor 224 as is a communications circuit 229. Still further, so-called W and G input circuits 238 are operable to be connected to a thermostat 240 by way of thermostat and controller "W" and "G" terminals while power to the control system 222 may be supplied by an HVAC system transformer (24 volt AC power) indicated by numeral 242. The W and G designations are in keeping with American National Standards Institute symbols for HVAC equipment. Alternatively, a separate transformer 244 may be used to supply power to the air filtration system 30 via the control system 222. Components 218, 232 and 236 may be mounted on a so-called daughter printed circuit board, not shown, supported on housing cover 91 adjacent to the associated displays and pushbutton switches previously described.

As shown in FIG. 20 also, the power supply connection to the control system 222 may be made at a connector 91a mounted on door cover 91, as illustrated. Accordingly, a high voltage DC power output supply for system 30 is typically provided from twenty-four volt AC power input to controller 222. Preferably, the high voltage supply unit 216, which may be of a type commercially available, will provide a self-regulating zero to ten kilovolt DC output voltage over an output current draw in the range of zero to six hundred micro amps DC. The DC high voltage output is controlled by a zero to five volt DC control voltage supplied to the high voltage power supply 216 by way of the microprocessor 224. A suitable EMI filter 217 is interposed the low voltage AC power sources 242 or 244 and power supply 216. A zero to five volt DC feedback signal is provided by way of the monitoring circuit 230. If an output current from power supply 216 greater than one milliamp DC is detected, the high voltage power supply 216 will disable its own output voltage for one minute, for example.

When a signal is received at one or the other of the so-called W or G signal inputs, FIG. 23, from a thermostat 240 the high voltage power supply 216 will be energized, typically at delay periods of ten seconds for a G signal input and ninety seconds for a W signal input. This arrangement will provide for energizing the filtration system 30 essentially only when the HVAC equipment associated with thermostat 240 is being operated, so as to minimize the accumulation of ozone, for example. In other words, when a fan motor of an HVAC unit, such as a unit 36 or 44, is being energized by a signal at terminal G, the filtration system 30 is turned "on". The same action is carried out when a signal at terminal W is also controlling a heating system, such as for an HVAC unit 36 or 44, which will result in energization of an associated fan motor. The high voltage power supply 216 is also controlled to "ramp up" the high voltage signals imposed on the filter units 74 and the field charging unit 76. The microprocessor 224 may be operated to increment a pulse width modulated signal at one second intervals to increase the DC output voltage from power supply 216 to the filter units 74 and the field charging unit 76 at one kilovolt increments until the desired operating voltage is achieved. The microprocessor 224 may also implement a ten minute delay of startup of the high voltage power supply 216 to allow recently washed filters 74 time to dry, for example. The delay period begins when either the W or G signals are initiated independent of whether or not switch 220 has been actuated.

High voltage DC power is turned off whenever a W or G signal is not present at microprocessor 224, when the switch 220 is pressed to initiate shutdown of the filtration system 30, or if a fault condition occurs. Power to the controller 222 and the power supply 216 is also interrupted if the door 86 is "opened" or removed from cabinet 62 thus causing the interlock switch 212 to open. Moreover, upon detection of momentary electrical arcing conditions, or repetitive arcing conditions, or if a user of the filtration system 30 operates the latch 170a which is connected to the shorting bar 206 to make contact with the terminal head 186, the high voltage power supply 216 will be turned off within one second, if a current of greater than one milliamp is detected by the high voltage power supply or if monitor 228 detects a current outside of a predetermined operating range. Still further, if the high voltage monitoring circuit 230 detects a high voltage output from the power supply 216 of greater than about ten percent of desired voltage, or if the output voltage is lower than the desired voltage by more than ten percent, both events, after predetermined periods of time, respectively, will cause the microprocessor 224 to shut off high voltage output from power supply unit 216.

Still further, if AC current input by way of the R and B terminals in FIG. 23 changes by more than about twenty-five percent, for example, the microcontroller 224 will respond by shutting off the high voltage power supply 216. Other fault conditions which may be monitored and acted on by the microprocessor 224 include actuation of the on/off switch 220 for more than a predetermined period of time, a stuck reset switch 223, detection of output from the power supply 216 when a system off condition has been initiated and detection of input current to the high voltage power supply when shutdown of the system 30 has been initiated, such as by opening or removing door 86. Still further, when switch 220 has been actuated to terminate power output from the high voltage power supply 216, the microprocessor 224 will power down the high voltage power supply and turn on all of the LEDs of the display 218 so that, as the voltage output potential from the power supply 216 decreases, the display will act as a countdown indicator changing colors from red to yellow to green to indicate when it is acceptable for a user to remove the door 86 from the cabinet 62.

Resetting prefilter and main filter timing in the microprocessor 224 may be carried out by pressing and holding the reset button switch 223 for preselected times, such as one to two seconds for resetting the time for prefilter 80 and four to five seconds for resetting the timing of the filter units 74, which latter action will also reset the prefilter timing. The multi LED "bar graph" display 218 will then energize a first green LED associated with the display. Of course, the above-described timing functions may be selected for energizing the LED bar graph display 218 to indicate filter status at preselected intervals such as every two months, every four months, every six months or every nine months, for example. Selected fault conditions may also be programmed into the microprocessor 224 for display by the LED bar graph display 218. Moreover, various test modes may be entered for testing the high voltage power supply 216, and for communications, for example, whereby the display 218 may indicate which test mode is active by the number or combination of LEDs illuminated for the display 218.

As mentioned previously, certain applications for the air filtration system 30 may be such that the HVAC system transformer 242 cannot support the current draw requirements of the filtration system. Accordingly, a separate one hundred twenty volt AC to twenty-four volt AC transformer 244 may be used to supply power for the system 30, including its controller 222. Conductors from the transformer 244 may also be connected to the terminals R and B of the controller 222, as indicated in FIG. 23. Still further, the W terminal of controller 222 will receive an eighteen to thirty volt AC signal when the thermostat 240 has a call for heat and the G terminal of the controller will receive an eighteen to thirty volt AC signal when the thermostat 240 has a call for operation of the fan motor of the associated air conditioning unit, such as the unit 36 or 44, for example. Also, as mentioned previously, when the door 86 is open, the interlock switch 212 will shut off all power to the entire control system or controller 222.

Accordingly, the controller 222 is operable to initiate operation of the filtration system 30, 30a or 30b in conjunction with operation of the fan motor for the fan 38 for an HVAC system or furnace 36 and an associated and substantially similar filtration system 30a would also be operable to commence operation in conjunction with energization of the fan 48 for the system or unit 44. In like manner, a stand-alone unit, such as the air filtration system 30b, could also be interconnected with a suitable unit of HVAC equipment to be powered up only when air is circulating through the duct 60, for example. In this way, any ozone created by the filtration system field charging unit 76 or the filter units 74 will not have a tendency to build up and exceed a desired or required level of concentration. Therefore, when a typical unit of HVAC equipment, such as a furnace or air handler, receives a call for heat or cooling or fan motor operation at thermostat terminals W or G, and these terminals are energized, a blower or fan motor will be energized within a very short period of time thereafter and by using the W or G control inputs as start signals for the controller 222, the field charging unit 76 and filters 74 will not be energized until a fan motor associated with the filtration system is driving an air circulating fan or blower at a suitable speed.

Figure 24:
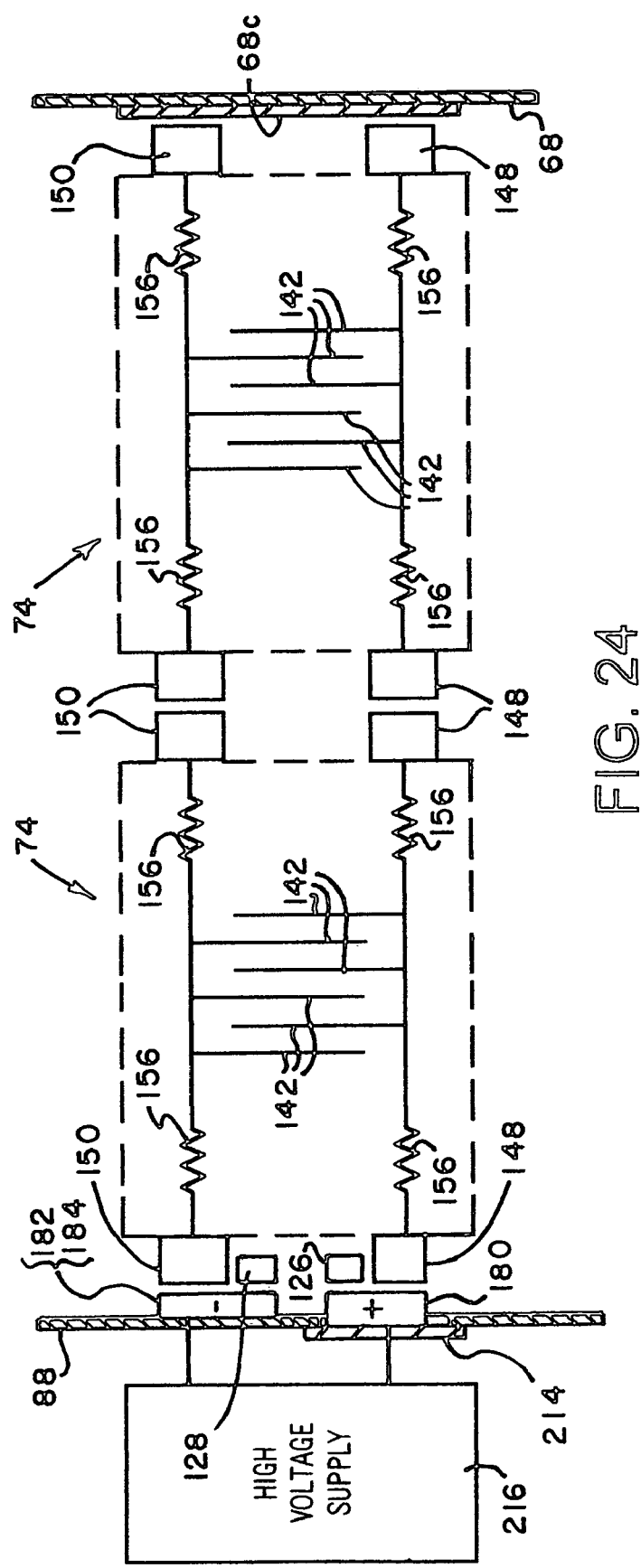
FIG. 24 is a diagram illustrating a preferred arrangement of the electrical connections to the filter units for the air filtration system of the invention.

Referring briefly to FIG. 24, there is illustrated a schematic diagram of the high voltage power supply 216 and its relationship to the filter units 74 and the terminals or contacts 126 and 128 for the charging unit 76. As will be noted from the diagram, a high voltage DC potential in the range of zero to ten kilovolts is imposed across the field charging unit and filter elements 136, as shown by the conductors 142 in FIG. 24. Resistors 156 rated at ten mega-ohms, preferably, are interposed in the filter unit circuits, as shown, to minimize current flows.

Except as otherwise noted herein, materials used for and fabrication of the components of the air filtration system 30 may be provided in accordance with conventional engineering practices for dielectric materials as well as conductive materials, and fabrication techniques may follow conventional practices for air filtration equipment. Moreover, the components of the controller 222 are commercially obtainable and are believed to be within the purview of one skilled in the art based on the foregoing description. Construction and operation of the air filtration systems 30, 30a and 30b is also believed to be within the purview of one skilled in the art based on the foregoing description.

Although preferred embodiments of the invention have been described in detail herein, those skilled in the art will recognize that various substitutions and modifications may be made without departing from the scope and spirit of the appended claims.

What is claimed is:

1. An air filtration system for an air conditioning system, said air filtration system comprising:
   a support structure;
   at least one filter unit mounted on said support structure for removal therefrom, said filter unit including an array of passages through which an air flowstream may pass relatively free and through a high voltage electric field for collecting particles on said filter unit from said air flowstream;
   a high voltage electric field charging unit mounted on said support structure upstream from said filter unit with respect to the direction of air flow through said filtration system;

said one filter unit and said field charging unit including electrical contact members operable to be in contact with a source of high voltage electric potential; and a door supported at said support structure for movement to a position to permit removal of said one filter unit from said support structure.

2. The filtration system set forth in claim 1 wherein:

said door includes spaced apart electrical contactors engageable with said contact members on at least one of said one filter unit and said field charging unit.

3. The filtration system set forth in claim 2 wherein:

said door includes one high potential contactor and at least two low potential contactors, spaced apart on said door.

4. The filtration system set forth in claim 3 wherein:

said door is adapted to be disposed on said support structure in two different positions with respect to said support structure.

5. The filtration system set forth in claim 2 wherein:

said door includes a control circuit disposed thereon and a connector for connecting said filtration system to a source of electric power, said control circuit including means for providing high voltage direct current power to said contactors on said door.

6. The filtration system set forth in claim 5 wherein:

said control circuit includes an interlock switch engageable with means on said support structure, said interlock switch being operable to interrupt said source of electric power to said filtration system when said door is moved with respect to said support structure.

7. The filtration system set forth in claim 2 wherein:

said door includes at least one latch member movable between a first position for latching said door to said support structure and a second position to permit movement of said door with respect to said support structure, said latch member being operably connected to means for discharging an electric potential on at least one of said one filter unit and said field charging unit in response to movement of said one latch member.

8. The filtration system set forth in claim 7 wherein:

said means comprises a link connected to said one latch member and to a member engageable with one of said contactors on said door, said link being connected to a grounding member connected to another of said contactors on said door.

9. The filtration system set forth in claim 1 including:

an air prefilter unit mounted on said support structure in a position upstream of said field charging unit with respect to the direction of air flow through said filtration system, said prefilter unit being removable from said support structure for cleaning or replacement thereof.

10. The filtration system set forth in claim 1 including:

a second filter unit supported on said support structure and including electrical contact members disposed thereon, said filter units each including plural electrical contact members disposed thereon and engageable with corresponding contact members on the other of said filter units to provide high voltage electrical potential to both of said filter units.

11. The filtration system set forth in claim 10 wherein:

at least two of said contact members on said filter units are disposed such as to engage contactors on said door for providing high voltage electric potential to said filter units.

12. The filtration system set forth in claim 1 wherein:

said support structure comprises a cabinet including spaced apart guide members for receiving said one filter unit in said cabinet whereby said one filter unit may be removably mounted on said cabinet, and guide members on said cabinet for receiving and supporting said field charging unit whereby said cabinet may receive said field charging thereon and for removal therefrom; and said cabinet includes means for supporting said door thereon.

13. The filtration system set forth in claim 12 wherein:

said cabinet is one of mounted on and interposed in a duct in communication with a unit of HVAC equipment for filtering air flowing to said unit of HVAC equipment.

14. The filtration system set forth in claim 1 wherein:

said support structure is part of a cabinet for a unit of HVAC equipment.

15. The filtration system set forth in claim 1 wherein:

said one filter unit includes a perimeter frame, a filter core assembly mountable on said frame, said filter core assembly including a stack of contiguous filter elements, said filter elements being stacked in an array where alternate ones of said filter elements is in electrical conductive contact with a positive high voltage potential and a negative high voltage potential, respectively, and conductor means on said core assembly in electrically conductive contact with said contact members on said filter unit.

16. The filtration system set forth in claim 15 wherein:

each of said filter elements including spaced apart sheet walls and generally parallel partitions spaced apart between said sheet walls and forming air flow passages, surface conductor means on at least one of said sheet walls, alternate ones of said filter elements being electrically connected to each other via conductor means electrically connected to said surface conductor means, respectively.

17. The filtration system set forth in claim 16 wherein:

said conductor means includes an elongated conductor strip disposed in a slot in each of said alternate ones of said filter elements and in electrical conductive contact with said surface conductor means, respectively.

18. The filtration system set forth in claim 15 including:

resistor means disposed in said conductor means between said filter elements and said contact members on said filter unit.

19. The filtration system set forth in claim 15 wherein:

said filter core assembly is secured to said frame by an adhesive and a perimeter sealant to permit washing said filter unit without contamination of said conductor means.

20. The filtration system set forth in claim 15 wherein:

said frame includes means cooperating with said support structure for requiring mounting said frame on said support structure in a predetermined position.

21. The filtration system set forth in claim 20 wherein:

said means on said frame cooperating with said support structure comprises a channel and said means on said support structure comprises a boss adapted to be disposed in said channel whereby said filter unit may be slidably engaged with and removed from said support structure.

22. The filtration system set forth in claim 1 wherein:

said field charging unit comprises a perimeter frame supporting a field charging plate having plural openings formed therein;

plural conductor pins mounted on said frame and disposed in alignment with said openings in said charging plate, respectively;

conductor means on said frame and operably connected to one of said contact members on said field charging unit for providing an electrical potential at each of said pins; and conductor means on said frame in electrically conductive contact with the other of said contact members of said field charging unit and said plate.

23. The filtration system set forth in claim 22 wherein:
said conductor means on said frame includes plural spaced apart elongated conductor strips connected to selected ones of said pins, respectively, and a busbar operably connected to said conductor strips and to one of said contact members on said field charging unit.

24. In an air conditioning unit, a cabinet including an air inlet and an air outlet and an air filtration system disposed in said cabinet for filtering air flowing therethrough, said filtration system including:
at least one filter unit mounted in said cabinet for removal therefrom, said filter unit including an array of passages through which an air flowstream may pass relatively free and through a high voltage electric field for collecting particles on said filter unit from said air flowstream;
a high voltage electric field charging unit mounted in said cabinet upstream from said filter unit with respect to the direction of air flow through said filtration system;
said filter unit and said field charging unit including electrical contact members operable to be in contact with a source of high voltage electric potential; and
a door movable to a position to permit removal of said one filter unit from said cabinet.

25. The filtration system set forth in claim 24 wherein:
said door includes spaced apart electrical contactors engageable with said contact members on at least one of said filter unit and said field charging unit.

26. The filtration system set forth in claim 25 wherein:
said door includes at least one latch member movable between a first position for latching said door in a closed position and a second position to permit movement of said door with respect to said cabinet, said one latch member being operably connected to means for creating a conductive path to discharge an electric potential on at least one of said filter unit and said field charging unit in response to movement of said one latch member.

27. The filtration system set forth in claim 26 wherein:
said means comprises a link connected to said one latch member and to a member engageable with one of said contactors on said door, said link being connected to a grounding member connected to another of said contactors on said door.

28. The filtration system set forth in claim 24 including:
a display disposed on said door for indicating an operating condition of said filtration system and an operating switch on said door for causing a controller for said filtration system to provide electric power to said filter unit and said field charging unit by way of said controller.

29. The filtration system set forth in claim 24 including:
a second filter unit including electrical contact members disposed thereon, said filter units each including plural electrical contact members disposed thereon and engageable with corresponding contact members on the other of said filter units to provide high voltage electrical potential to both of said filter units.

30. The filtration system set forth in claim 29 wherein:
at least two of said contact members on said filter units are disposed such as to engage corresponding contactors on said door for providing high voltage electric potential to said filter units.

31. The filtration system set forth in claim 24 wherein:
said filter unit includes a perimeter frame, a filter core assembly mountable on said frame, said filter core assembly including a stack of contiguous filter elements, said filter elements being stacked in an array whereby alternate ones of said filter elements are in electrical conductive contact with a positive high voltage potential and a negative potential, respectively, and conductor means on said core assembly in electrically conductive contact with said contact members on said filter unit.

32. The filtration system set forth in claim 31 wherein:
each of said filter elements including spaced apart sheet walls and generally parallel partitions spaced apart between said sheet walls and forming air flow passages, surface conductor means on at least one of said sheet walls, alternate ones of said filter elements being electrically connected to each other via conductor means electrically connected to said surface conductor means, respectively.

33. The filtration system set forth in claim 32 wherein:
said conductor means includes an elongated conductor strip disposed in a slot in each of said alternate ones of said filter elements and in electrical conductive contact with said surface conductor means, respectively.

34. The filtration system set forth in claim 31 including:
resistor means disposed in said conductor means between said filter elements and said contact members on said filter unit.

35. The filtration system set forth in claim 24 wherein:
said field charging unit comprises a perimeter frame supporting a field charging plate having plural openings formed therein;
plural conductor pins mounted on said frame and disposed in alignment with said openings in said charging plate, respectively;
conductor means on said frame and operably connected to one of said contact members on said field charging unit for providing an electrical potential at each of said pins; and
conductor means on said frame in electrically conductive contact with the other of said contact members of said field charging unit and said plate.

36. The filtration system set forth in claim 35 wherein:
said conductor means on said frame includes plural spaced apart elongated conductor strips connected to selected ones of said pins, respectively, and a busbar operably connected to said conductor strips and to one of said contact members on said field charging unit.

* * * * *